United States Patent Office 3,497,254
Patented Feb. 24, 1970

3,497,254
VACUUM LIFTING APPARATUS
Hans A. Lutolf and Josef B. B. Belser, Reussbuhl, Lucerne, Switzerland, assignors to Societe de la Viscose Suisse, Emmenbrucke, Switzerland, a corporation of Switzerland
Filed Apr. 20, 1967, Ser. No. 632,301
Claims priority, application Switzerland, Apr. 29, 1966, 6,269/66
Int. Cl. B66c 1/02; A47b 97/00
U.S. Cl. 294—64                                  6 Claims

ABSTRACT OF THE DISCLOSURE

A portable vacuum lifting apparatus is provided including a housing having a vacuum chamber therein peripherally defined by a flexible flange. A vacuum pump is mounted on the housing and communicates with the chamber by a valved passage.

---

Figure 1:
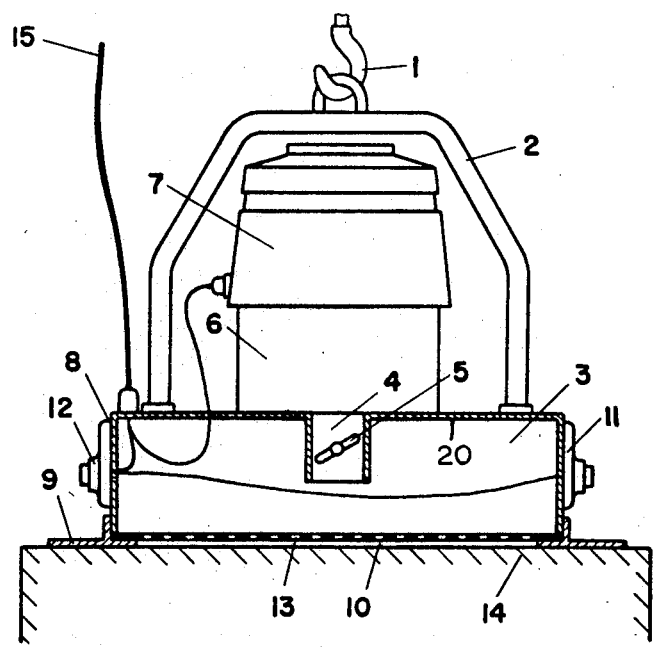

This invention relates to a vacuum lifting apparatus especially suitable for gripping and lifting of air-permeable articles comprising a box-like suction chamber with a suction outlet and a sealing plate consisting of flat, flexible, non-compressible sheet material tightly bonded to the side walls at the open end of said suction chamber, said sealing plate having a central opening and being arranged parallel to the surface of the atricle to be lifted.

Various instruments have been described which can grip and/or lift articles by the use of vacuum. One type of such instruments requires that at least the area to be lifted is impermeable to air. Thus, many instruments are known which are designed as a suction head or combined with an air suction apparatus. They are suitable to lift metal or plastic plates, wood, glass, and furniture made of smooth, air-impermeable materials. Special devices also allow lifting of articles having uneven or bent areas, e.g., pipes and tubes.

Another type of instruments has several suction heads or a suction area subdivided in several sectors. Preferably, such instruments allow switching off those suction heads or sectors which contact air-permeable areas or protrude over the edges of the article to be lifted. Some instruments also require covering of air-permeable articles with air-impermeable foils or other means.

Finally, there are instruments with a sealing device extending over the area to be lifted, or with a sealing device in the form of a flexible curtain depending from the head box upon the load. In this case, the form of the lifting head must correspond to the form of the area to be lifted, and the lifting head together with the curtain-like sealing device covers a considerable portion of the load.

The vacuum lifting apparatus according to this invention avoids the application limits and disadvantages of lifting instruments already known. It is suitable for gripping and lifting of air-impermeable and air-permeable articles, such as cardboard- or wooden boxes, or other articles having no protruding cords or hoop irons. The apparatus is likewise suitable for moving of such articles in a lateral direction.

For the purpose of illustrating the invention, there is shown in the drawings a form which is presently preferred; it being understood, however, that this invention is not limited to the precise arrangements and instrumentalities shown.

Figure 2:
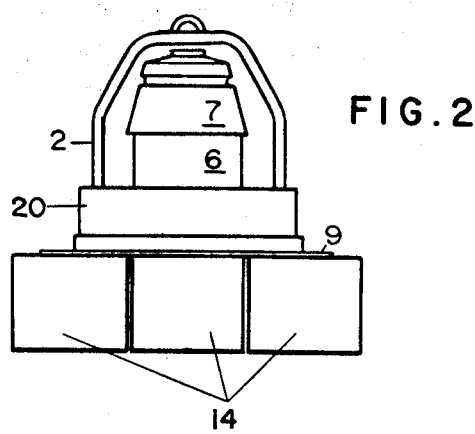
Figure 3:
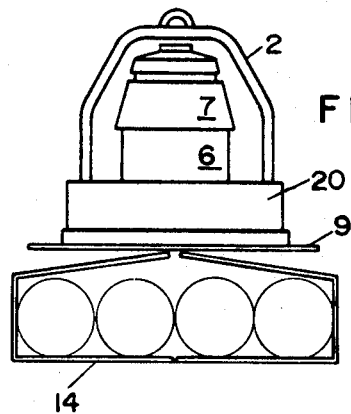
Figure 3A:
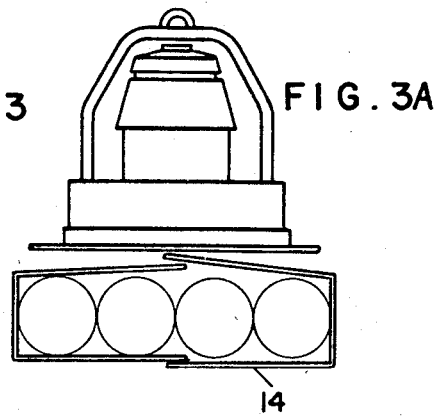
Figure 4:
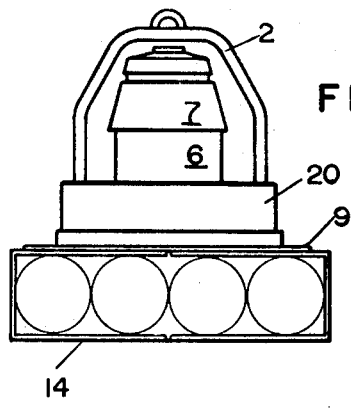
Figure 4A:
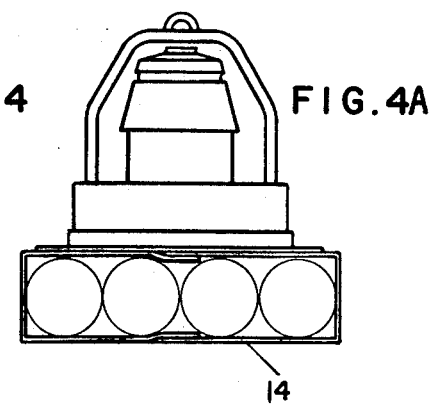

FIGURE 1 is a cross section of the apparatus.
FIGURE 2 shows the apparatus arranged to lift a tier of several articles.
FIGURES 3 and 3A show the apparatus immediately before lifting of different types of untied and incompletely closed cardboard boxes.
FIGURES 4 and 4A show the apparatus with the lifted boxes of FIGURES 3 and 3A.

In FIGURE 1 the apparatus is suspended from crane hook 1 by means of iron ring 2 fixed to hollow box-like housing 20 having a suction chamber 3. In the top of the suction chamber 3 is suction outlet 4 which can, partially or completely, be closed by valve 5. Suction outlet 4 can be connected with the suction inlet of a vacuum generator 6 driven by motor 7 mounted on and supported by housing 20.

Sealing plate 9 consisting of flat, flexible, non-compressible sheet material has a central opening 10 and is tightly bonded to the side walls 8 of the open end of the housing 20 and is arranged parallel to the surface of the article to be lifted. The central opening 10 is situated between perforated bottom 13 of the suction chamber and load 14 to be lifted or moved laterally. Preferably, sealing plate 9 shall have a rim extending about 2–10 cm. beyond the side walls 8 of the housing 20.

For easy manipulation it is also preferred to have a steering device 11 and a vacuum switch 12 directly attached to suction chamber 3. If however the apparatus has to make considerable lifting movements, it is recommended to arrange the steering device and switch separate from the apparatus and to connect them by cables.

Crane hook 1 can form part of any suitable lifting device, such as cranes, lifts, or mechanical, pneumatical or hydraulical lifting, tilting- or revolving apparatus. Crane hook 1 can further be used to hold articles in any machine, apparatus or transport.

The box-like housing 20 can be of circular, rectangular or any other form and need not be of the same form as the surface of the load. One lifting apparatus according to the invention is therefore sufficient to lift articles of very different form, weight, and nature. In most cases, one apparatus can also simultaneously lift several objects standing together (FIGURE 2).

The sealing plate 9 may be made of natural or synthetic rubber or of any plastic material having similar properties. The form of the sealing plate may be similar to, or different from, the form of the surface of the open end of housing 20. Also, the central opening 10 of sealing plate 9 may have different forms, and may, for example, in its outline exactly follow the inner sides of side walls 8.

By the dynamic effect of the air flowing between load 14 and sealing plate 9, the sealing plate is pressed against the surface of the load and forms the sealing bond between load 14 and suction chamber 3. The surface of the load gripped by the apparatus shall therefore be larger than the area of the suction chamber including sealing plate.

Suction outlet 4 can be connected with any stationary or mobile vacuum generator. For most purposes a mobile vacuum generator is preferred, and especially suitable is a device, wherein the vacuum generator 6 with motor 7 is directly fixed to suction outlet 4. The electric current for vacuum generator 6 is supplied by cable 15 which can pass over crane hook 1, and which can also include connecting lines for steering device 11 and vacuum switch 12.

The apparatus according to the invention is especially suitable for gripping and lifting of air-permeable articles such as boxes of cardboard, corrugated board or wood, and bags and bales. The articles to be lifted are treated with great care, and no heavy pressure and no strong pulling force is applied to the surface of the articles. The articles need not stand free; it is sufficient to place the lifting apparatus on the top surface of the article, and articles standing in a tier can also separately be lifted. It goes without saying that the apparatus is also suitable for gripping and lifting of air-impermeable objects.

The operation of the vacuum lifting apparatus requires that sufficient quantities of air can be sucked through vacuum outlet 4. As as example, the air flow required for a certain type of corrugated cardboard boxes may be given, the cardboard of which has the following composition:

| | |
|---|---|
| Outer layer | 200 g. per sp. m. kraft liner. |
| Fine corrugate | 112 g. per sq. m. fluting. |
| Intermediate layer | 200 g. per sq. m. kraft liner. |
| Coarse corrugate | 112 g. per sq. m. fluting. |
| Inner layer | 200 g. per sq. m. kraft liner. |

Such boxes having, for example, a length of 64 cm., a width of 44 cm., and a height of 40 cm., and which contain a load of 50 kg. consisting of textile bobbins, bottles or the like, require a blowing device with an output of about 50 litres per second and 2000 mm. water column, when the suction area of the central opening 10 of sealing plate 9 is about 1000 sq. cm. Loads having a higher air-permeability require a blowing device of higher output, and vice versa.

The pressure exerted by the air flowing against all surfaces of the load reduces the size or even closes a considerable portion of any apertures in the cover of the load. This is especially useful when defective cardboard boxes with cut edges are to be used, as such cuts are closed by the air flow. The size reduction or closing of such apertures also increases the air resistance of the load and thus improves the holding power of the lifting apparatus.

If the apparatus has once gripped a load, it can be trusted to hold it safety. On the other hand, if its lifting power is too low for a given load, and if any apertures cannot be closed sufficiently, the apparatus will not grip the load, thereby reducing the possibility of an accident.

Another advantage of the apparatus is the following: Top and bottom of cardboard boxes are usually formed by cardboard fixed to the side walls of the box. Before filling the box, the cardboard forming the bottom is usually pressed down without being bonded together, the final closing by stitching, bonding or any other means being deferred. If such boxes are lifted without applying suction, the bottom would open and release the contents. The vacuum lifting apparatus according to the invention can however also lift such boxes with a loose cardboard bottom, because the air flow presses the cardboard together and prevents its opening. For the same reason, also the top cardboard needs no bonding together before lifting (FIGURES 3, 3A, 4 and 4A).

When using a type of the apparatus to which a vacuum generator 6 is directly attached, and which has to lift and release loads in quick succession, a corresponding switching on and off of the vacuum generator is impractical, because considerable masses need be stopped and accelerated again. Thus, when an electro-motor acting as a vacuum generator is switched off, running of the motor and flowing of air will continue for some time with the result that a lifted load is not released at once. To avoid this, suction outlet 4 is provided with a valve 5 which permits an immediate stop of the air flow, while the motor is switched off only when work is interrupted for longer periods.

Energy consumption of the motor is proportional to the air flow, which is at its maximum when the motor is running with no load attached to the apparatus. This is, e.g., the case when the apparatus is moving towards the load, and, to reduce energy consumption, it is therefore recommended to reduce the air flow by valve 5. However, valve 5 should only be closed very shortly for releasing the load, as without new air supply, the air inside the suction chamber of the vacuum generator may become dangerously hot. Preferably, valve 5 should therefore be fitted with an intermediate mark or notch between the open and closed positions permitting a permanent small air flow through a by-pass. It is further recommended to provide means for controlling the air temperature in the generator or any safeguard devices switching off the motor when a certain temperature is exceeded.

If it is however necessary to stop the vacuum generator every time the load is released, the generator should be provided with a stop brake device which acts immediately when the motor is switched off.

The present invention may be embodied in other specific forms without departing from the spirit or essential attributes thereof.

We claim:

1. In a vacuum lifting apparatus comprising a housing having a vacuum chamber therein, a vacuum pump supported by the housing, a valved passage communicating the pump with the chamber, means supported by the housing to facilitate lifting the housing from a position above the housing, a sealing plate extending radially outwardly along the whole lower periphery of the housing and having a central opening communicating wtih the chamber, said sealing plate being of rubber or plastic, said plate being a flat flexible non-compressible sheet of material adapted to be parallel to the surface of the article to be lifted by the dynamic effect of the air flowing between that surface and the sealing plate.

2. Apparatus in accordance with claim 1 including a switch on said housing for controlling operation of said motor.

3. Apparatus in accordance with claim 1 including a small air flow vent providing constant communication between said chamber and pump regardless of the position of the valve in said passage.

4. Apparatus in accordance with claim 1 wherein said means facilitating lifting the housing includes a ring for engagement with a lifting hook, said ring being centrally located and having a portion above the pump.

5. Apparatus in accordance with claim 6 including a perforated bottom on said housing, said perforated bottom lying in a plane contiguous to the plane of said plate, said plate extending radially inwardly of the housing and supporting the periphery of said perforated bottom.

6. Apparatus in accordance with claim 1 wherein the cross section of the passage is substantially smaller than the cross section of said chamber.

References Cited

UNITED STATES PATENTS

| | | | |
|---|---|---|---|
| 1,997,365 | 4/1935 | Howard | 137—111.9 |
| 3,338,615 | 8/1967 | Fogg | 294—64 |
| 3,387,718 | 6/1968 | Roth | 294—64 |
| 740,534 | 10/1903 | Cleathero | 294—64 |
| 1,426,930 | 8/1922 | Waldron | 294—64 |
| 3,259,417 | 7/1966 | Chapman | 294—64 |
| 3,314,559 | 4/1967 | Horton | 294—65 |
| 3,354,856 | 11/1967 | Annibale | 294—64 X |

FOREIGN PATENTS

| | | |
|---|---|---|
| 1,433,973 | 2/1966 | France. |

HARVEY C. HORNSBY, Primary Examiner